United States Patent
Beers

(10) Patent No.: US 11,041,951 B2
(45) Date of Patent: Jun. 22, 2021

(54) ULTRASOUND IMAGING PROBE WITH A GRADIENT REFRACTIVE INDEX LENS

(71) Applicant: Sound Technology Inc., State College, PA (US)

(72) Inventor: Christopher Beers, State College, PA (US)

(73) Assignee: Sound Technology Inc., State College, PA (US)

( * ) Notice: Subject to any disclaimer, the term of this patent is extended or adjusted under 35 U.S.C. 154(b) by 544 days.

(21) Appl. No.: 15/902,463

(22) Filed: Feb. 22, 2018

(65) Prior Publication Data
US 2019/0257943 A1 Aug. 22, 2019

(51) Int. Cl.
| | | |
|---|---|---|
| *G01S 15/89* | (2006.01) | |
| *G01S 7/521* | (2006.01) | |
| *B06B 1/02* | (2006.01) | |
| *B06B 3/00* | (2006.01) | |
| *G10K 11/30* | (2006.01) | |
| *G01S 7/52* | (2006.01) | |
| *B06B 1/06* | (2006.01) | |

(52) U.S. Cl.
CPC ............ *G01S 15/8925* (2013.01); *B06B 1/02* (2013.01); *B06B 3/00* (2013.01); *G01S 7/521* (2013.01); *G01S 7/52079* (2013.01); *G10K 11/30* (2013.01); *B06B 1/0629* (2013.01)

(58) Field of Classification Search
CPC .. G01S 15/8925; G01S 7/52079; G01S 7/521; G10K 11/30; B06B 1/02; B06B 3/00; B06B 1/0629
See application file for complete search history.

(56) References Cited

U.S. PATENT DOCUMENTS

| | | | | |
|---|---|---|---|---|
| 4,387,720 A | | 6/1983 | Miller | |
| 4,956,000 A | * | 9/1990 | Reeber | ............... C03B 19/1415 |
| | | | | 264/2.1 |
| 5,031,626 A | * | 7/1991 | Hassler | .................... A61B 8/14 |
| | | | | 600/439 |
| 5,349,262 A | * | 9/1994 | Grenon | ............... G01S 15/8927 |
| | | | | 310/334 |

(Continued)

OTHER PUBLICATIONS

GRINTech, Gradient Index Optics Technology, Gradient Index (GRIN) Lenses, Revised Dec. 2015.

(Continued)

*Primary Examiner* — Ian J Lobo
(74) *Attorney, Agent, or Firm* — Anthony M. Del Zoppo, III; Daugherty & Del Zoppo Co., LPA

(57) ABSTRACT

A transducer probe includes a transducer array with rows of transducer elements that each extend in an elevation direction and is transverse to an azimuth direction, a matching layer disposed adjacent to the transducer array, and a focusing layer disposed adjacent to the matching layer. The focusing layer includes a first material with a first refractive index and a second material with a second refractive index, and the first refractive index is less than the second refractive index. The first and second materials are distributed in an alternating pattern with the first material at edges of the rows. First widths of the first material decrease from the edges towards a center of the rows, and second widths of the second material increase from the edges towards the center.

20 Claims, 9 Drawing Sheets

(56) References Cited

U.S. PATENT DOCUMENTS

| | | | | |
|---|---|---|---|---|
| 5,577,507 | A | * | 11/1996 | Snyder ................ A61B 8/4281 600/472 |
| 5,974,884 | A | | 11/1999 | Sano et al. |
| 6,822,374 | B1 | * | 11/2004 | Smith ................... H04R 17/00 310/334 |
| 9,214,152 | B2 | | 12/2015 | Kunkel et al. |
| 9,662,679 | B2 | | 5/2017 | Chen et al. |
| 9,772,476 | B2 | | 9/2017 | Jeong et al. |
| 2005/0105191 | A1 | * | 5/2005 | Baer .................... G02B 3/0087 359/652 |
| 2007/0038082 | A1 | * | 2/2007 | Mo ..................... G01S 15/8952 600/437 |
| 2007/0197917 | A1 | * | 8/2007 | Bagge ................... G10K 11/30 600/459 |
| 2007/0222339 | A1 | * | 9/2007 | Lukacs ................ B06B 1/0622 310/335 |
| 2008/0156577 | A1 | | 7/2008 | Dietz et al. |
| 2016/0216412 | A1 | * | 7/2016 | Kintz .................... G02B 13/14 |

OTHER PUBLICATIONS

Zigoneanu, et al., Design and measurements of a broadband two-dimensional acoustic lens, American Physical Society Review B 84, pp. 024305-1-024305-5. Jul. 26, 2011.

Li, Y. et al., Three-dimensional Ultrathin Planar Lenses by Acoustic Metamaterials, Sci. Rep. 4, 6830; DOI:10.1038/srep06830 (2014).

Su, X et al., Broadband focusing of underwater sound using a transparent pentamode lens, The Journal of the Acoustical Soc. of Am. 141, 4408 (2017).

Lin, Sz., et al., Design of Acoustic Beam Aperture Modifier Using Gradient-Index Phononic Crystals, IEEE International US Symposium Proceedings (2010).

* cited by examiner

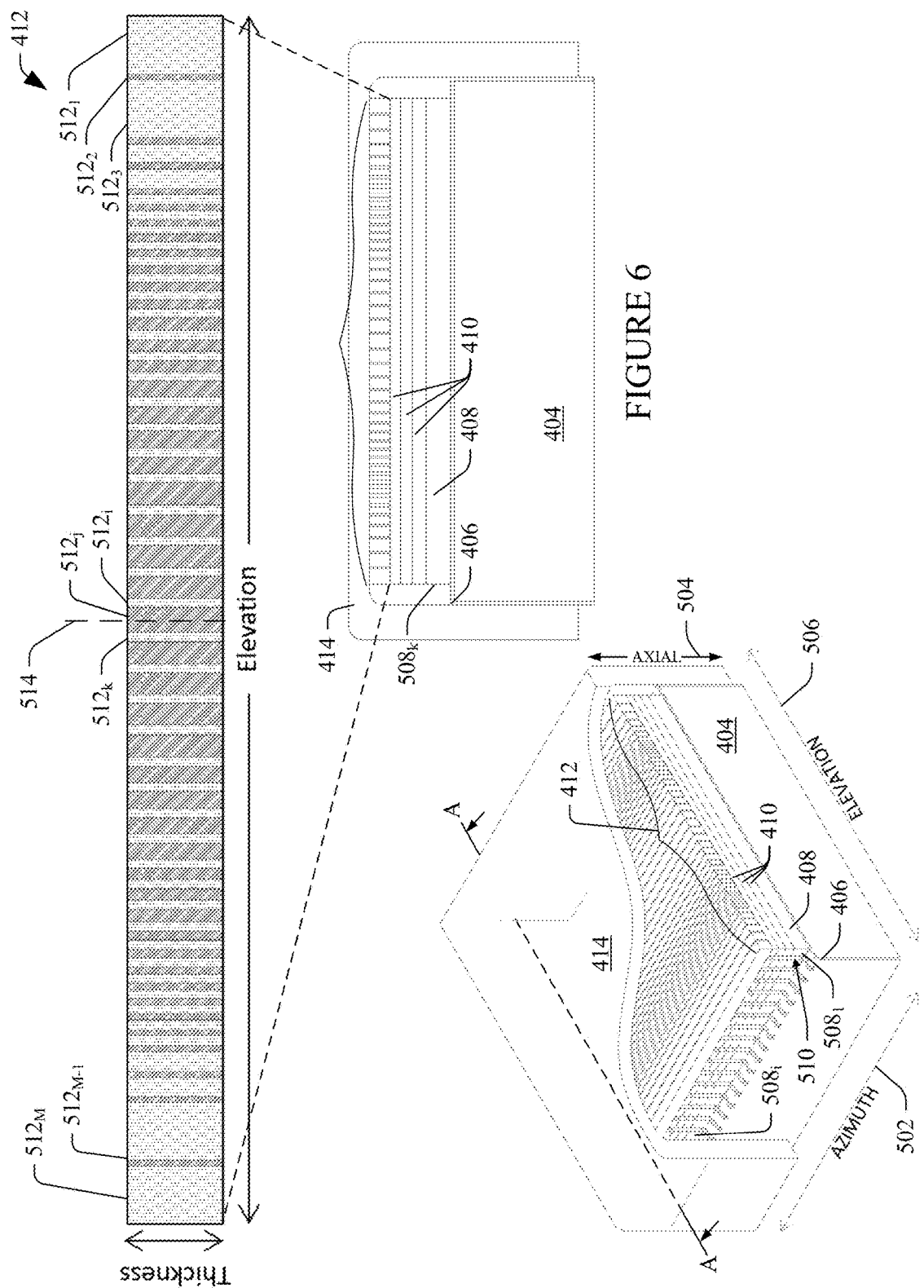

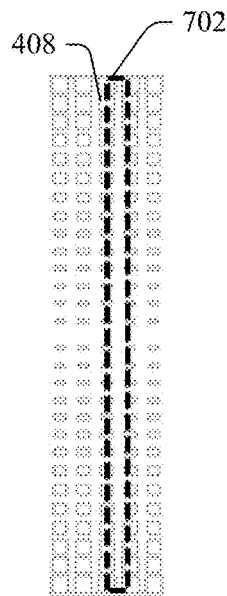 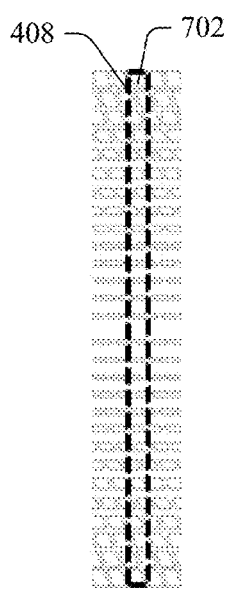 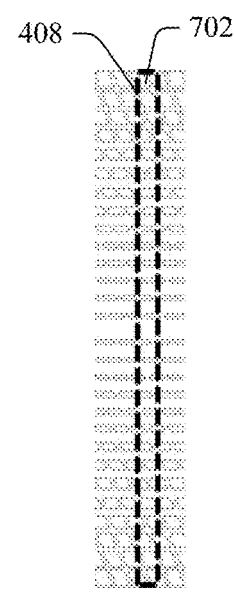 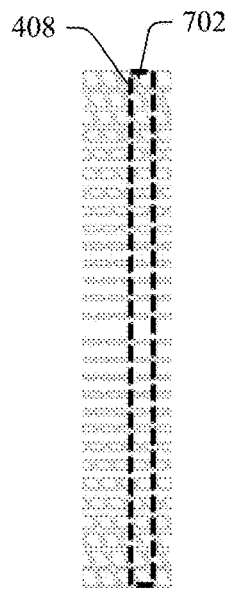
FIGURE 14    FIGURE 15    FIGURE 16    FIGURE 17
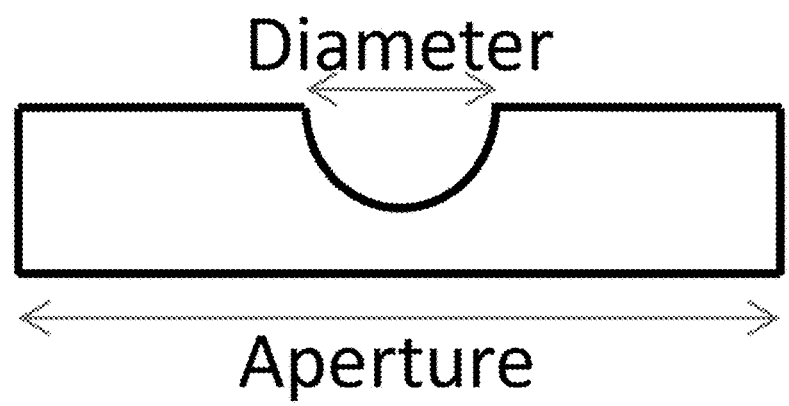
FIGURE 18

ULTRASOUND IMAGING PROBE WITH A GRADIENT REFRACTIVE INDEX LENS

TECHNICAL FIELD

The following generally relates to ultrasound imaging and more particularly to an ultrasound imaging probe with a gradient refractive index lens.

BACKGROUND

Ultrasound probes have included a focusing lens between tissue and an acoustic stack (transducer and matching layers). Examples of suitable lens materials include room-temperature-vulcanization (RTV) silicone and polymethylpentene, which is also referred to as TPX™, a product of Mitsui Chemicals, Tokyo, Japan. In general, TPX is better suited for high-frequency transducers where lens attenuation is important because TPX attenuation is significantly lower than RTV attenuation so TPX enables higher sensitivity (and thereby penetration) and higher frequencies than RTV. Additionally, TPX acoustic impedance is a better match than RTV between matching layer and tissue. Furthermore, TPX is better suited for surgical ultrasound probes, which encounter a wider range of chemicals than non-surgical external probes and are often used in the vicinity of sharp surgical tools, since TPX is inert and impervious to diverse biological materials and harsh chemical cleaners and robust.

RTV has a speed that is lower than tissue. As such, to focus, its external surface has to be convex for acoustic stacks that are flat in elevation. An example of this is shown in FIG. 1. In contrast, TPX has a speed that is higher than tissue, and so its external surface has to be concave for acoustic stacks that are flat in elevation. An example of this is shown in FIG. 2A. However, the concave external surface profile is not well-suited for patient contact. One solution is to use TPX with a flat external surface and an acoustic stack that is concave in elevation. An example of this is shown in FIG. 2B. While this approach is better suited for patient contact, it presents processing complexities for the acoustic stack. For example, where the active layer and the matching layer(s) must be amenable to thermo-forming, the active layer is limited to a piezo-composite, precluding a solid piezoelectric (e.g., a single crystal) or Capacitive Micromachined Ultrasonic Transducer (CMUT) active layer.

It also limits the passive layer material selections, precluding both high-impedance (10-18 MRayl) matching layer materials for a triple-matching-layer system and a de-matching layer material (>60 MRayl) for acoustically clamping the back surface of the active layer. For single crystal or high-impedance layers, their resistance to thermoforming could be addressed by making them into composites. However, grinding single crystal composite is still an emerging process and requires a great deal of care due to the propensity of the crystal to chip and crack. Furthermore, making the high-impedance materials into composites would reduce their acoustic impedance and, consequently, their performance characteristics. Instead of thermo-forming, these layers could be processed with curved grinding instead of being ground flat and then curved. However, this technique presents other significant challenges, such as holding the requisite layer thickness and concentricity requirements.

A solution to this is a compound lens, in which two or more lenses are stacked external to the matching layers. Examples are shown in FIGS. 3A and 3B. Unfortunately, several issues are inherent to compound lenses. For example, it can be very difficult to find a material combination that meets the requirements of (a) matched acoustic impedance, (b) widely different velocities, and (c) low attenuation. Additionally, the angular response can also be negatively affected due to the mode conversions and angles of refraction in the azimuth direction.

SUMMARY

Aspects of the application address the above matters, and others.

In one aspect, a transducer probe includes a transducer array with rows of transducer elements that each extend in an elevation direction and is transverse to an azimuth direction, a matching layer disposed adjacent to the transducer array, and a focusing layer disposed adjacent to the matching layer. The focusing layer includes a first material with a first refractive index and a second material with a second refractive index, and the first refractive index is less than the second refractive index. The first and second materials are distributed in an alternating pattern with the first material at edges of the rows. First widths of the first material decrease from the edges towards a center of the rows, and second widths of the second material increase from the edges towards the center.

In another aspect, an apparatus includes a probe array with a backing layer, an interconnect disposed adjacent to the backing layer, a transducer array disposed adjacent to the interconnect, and a gradient refractive index lens disposed adjacent to the transducer array. The apparatus further includes transmit circuitry that conveys an excitation pulse to the transducer array, receive circuitry that receives a signal indicative of an ultrasound echo from the transducer array, and a beamformer that processes the received signal, generating ultrasound image data.

In another aspect, a method includes transmitting an ultrasound signal with an ultrasound probe, receiving an echo signal with the ultrasound probe, beamforming the echo signal to create an image, and displaying the image. The ultrasound probe includes a backing layer, an acoustic layer disposed adjacent to the backing layer, and a gradient refractive index lens disposed adjacent to the transducer array, wherein the gradient refractive index lens includes a varying structure configured to vary a sound speed so that a time-of-flight is shorter at edges of elevation and longer at a center of elevation.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which:

FIG. 5 illustrates a perspective view of an example of a 2-2 composite focusing layer of FIG. 4.

FIG. 6 illustrates a cross-sectional view of the focusing layer of FIG. 5.

FIG. 14 illustrates an example where a single row of posts of the focusing layer of FIG. 7 are not aligned with a transducer element.

FIG. 15 illustrates an example where a single row of posts of the focusing layer of FIG. 12 are not aligned with a transducer element.

FIG. 16 illustrates another example where a single row of posts of the focusing layer of FIG. 12 are not aligned with a transducer element.

FIG. 17 illustrates yet another example where a single row of posts of the focusing layer of FIG. 12 are not aligned with a transducer element.

FIG. 18 shows a limitation in traditional lenses for defocusing.

DETAILED DESCRIPTION

Figure 1:
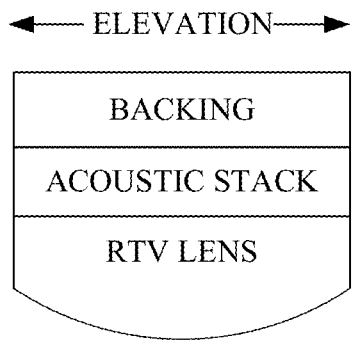
FIG. 1 schematically illustrates a prior art example probe with a planar-planar acoustic stack and a planar-convex RTV lens.
Figure 2A:
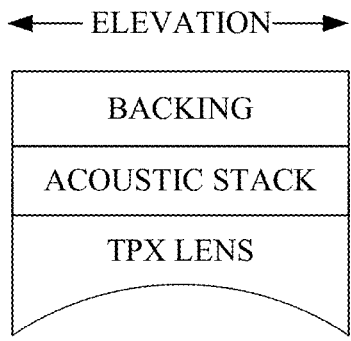
FIG. 2A schematically illustrates a prior art example probe with a planar-planar acoustic stack and a planar-concave TPX lens.
Figure 2B:
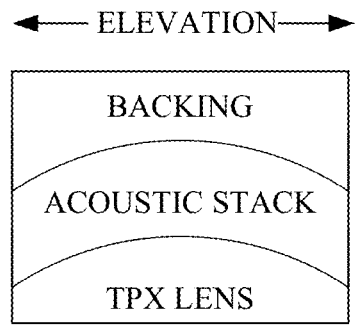
FIG. 2B schematically illustrates a prior art example probe with a convex-concave acoustic stack and a convex-planar TPX lens.
Figure 3A:
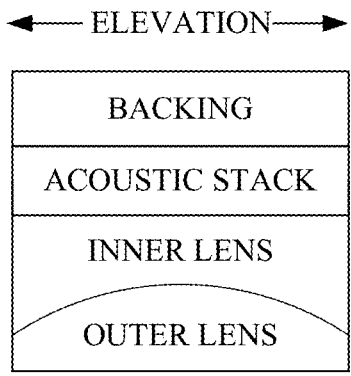
FIG. 3A schematically illustrates a prior art example probe with a compound lens with an inner planar-concave lens and an outer convex-planar lens.
Figure 3B:
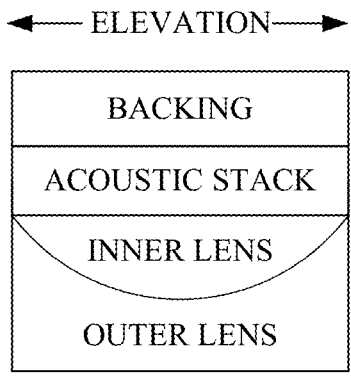
FIG. 3B schematically illustrates a prior art example probe with a compound lens with an inner planar-convex lens and an outer concave-planar lens.
Figure 4:
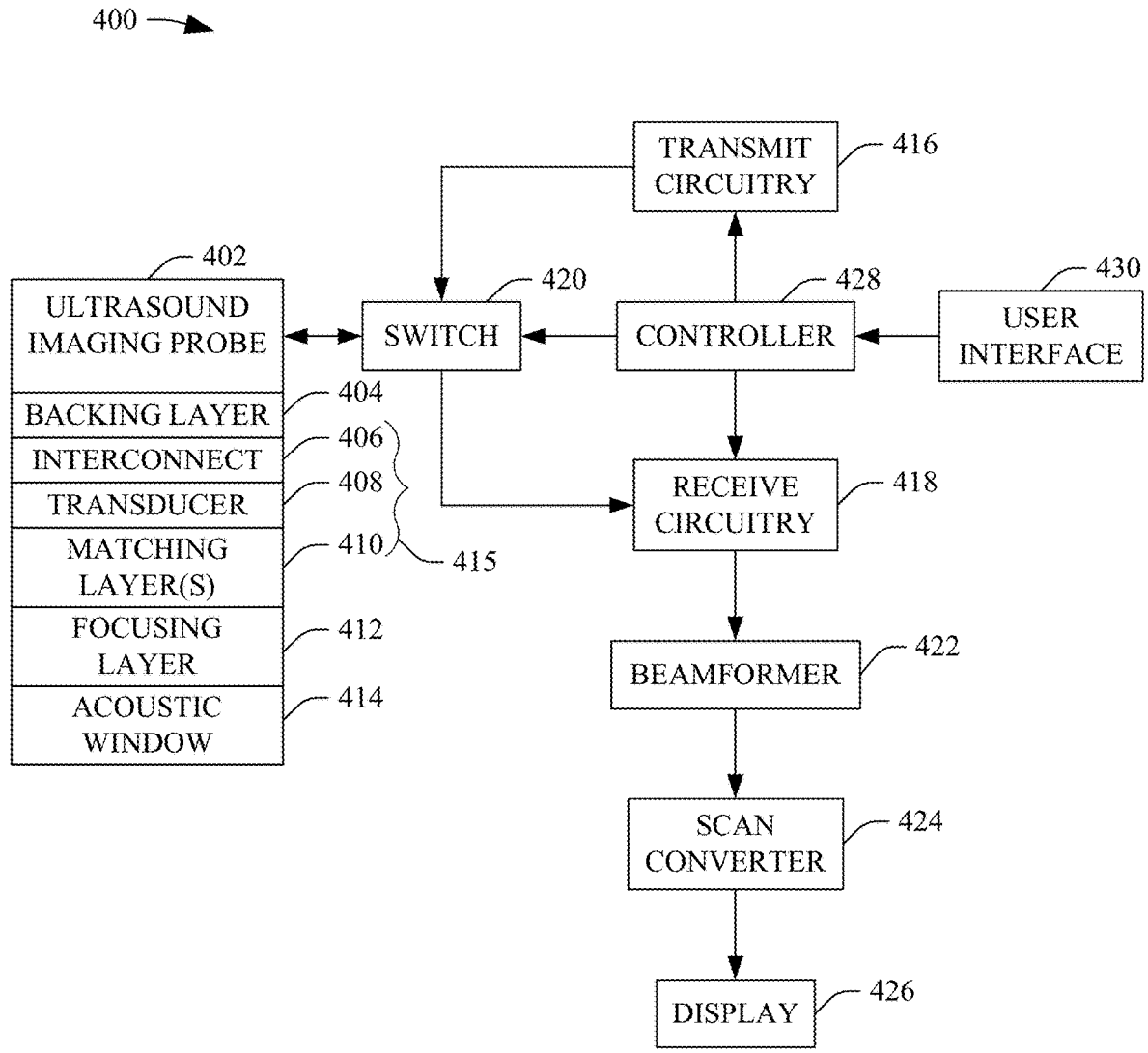
FIG. 4 schematically illustrates an example ultrasound imaging system with an ultrasound imaging probe with a focusing layer with a gradient refractive index lens.

FIG. 4 schematically illustrates an example ultrasound imaging system 400. The ultrasound imaging system 400 includes an ultrasound imaging probe 402. The illustrated ultrasound imaging probe 402 includes at least a backing layer 404, an interconnect 406, a transducer 408, one or more matching layers 410, a focusing layer 412, and an acoustic window 414. A combination of the interconnect 406, the transducer 408, the one or more matching layers 410 are referred herein as an acoustic stack 415. The focusing layer 412 is also referred to herein as a gradient refractive index lens (GRIN).

In general, the backing layer 404 provides mechanical support for at least the transducer 408, the interconnect 406 routes electrical signals produced by the transducer array 408 for processing, the matching layer(s) 410 couple the acoustic energy from the transducer 408 to the transmission medium, the focusing layer 412 focuses the acoustic energy, and the acoustic window 414 provides a structural interface between the probe 402 and an object or subject to be or being scanned.

The transducer 408 includes a one or two-dimensional array of transducer elements. Example arrays include sector, linear, curved, square, rectangular, circular, irregular and/or other shaped arrays, and example elements include piezo-composite, solid piezoelectric (e.g., a single crystal), CMUT, and/or other ultrasound imaging transducer elements. The transducer elements are configured to transmit pressure waves, receive echo signals (which are generated in response to the pressure waves interacting with stationary and/or flowing structure), and generate electrical signals indicative thereof.

The focusing layer 412 includes a composite of two or more materials with a varying structure across elevation, which achieves a predetermined focusing. As described in greater detail below, in one example, the varying structure includes a faster material towards edges of elevation and a slower material toward a center of elevation. This varying structure varies the sound speed in such a way that a time-of-flight (TOF) is shorter on the edges, longer at the center, and varies across elevation such that it mimics the effect of a standard focusing lens. The TOF can be determined according to the elevation dimension and the intended focal depth. The sound speed variation arises from the variation in the structure of the composite since the effective sound speed in the composite depends on the velocities of its constituent materials and their volume fraction.

In one non-limiting configuration using the focusing layer 412, the acoustic stack 415 is flat in elevation and the focusing layer 412 includes a non-concave TPX external surface. As such, the transducer 408 can include piezo-composite transducer elements, solid piezoelectric transducer elements or CMUT transducer elements, while also providing at least one of the benefits of TPX lenses described herein. This includes, e.g., lower attenuation, better acoustic impedance match, more inert and impervious to materials and cleaners, more physically robust, well-suited for patient contact, high-impedance matching layer materials, de-matching layer material for acoustically clamping the back surface of the active layer, etc. In another non-limiting configuration using the focusing layer 412, the focusing layer 412 is planar-convex and coupled to a concave-planar or concave-convex outer lens.

The ultrasound imaging system 400 further includes transmit circuitry 416 that generates pulses that excite a predetermined set of the elements of the transducer 408 to transmit the ultrasound signals. The ultrasound imaging system 400 further includes receive circuitry 418 that receives the electrical signals. In one instance, the receive circuitry 418 is configured to pre-process the received signals, e.g., by amplifying, digitizing, etc. the signals. The ultrasound imaging system 400 further includes a switch 420 that switches between the transmit and receive circuitry 416 and 418, depending on whether the transducer 408 is in transmit or receive mode.

The ultrasound imaging system 400 further includes a beamformer 422 that processes the signals, for example, by applying time delays and weights, summing, and/or otherwise processing the received signal. Other processing is also contemplated herein. The ultrasound imaging system 400 further includes a scan converter 424 that scan converts the beamformed data, converting the beamformed data into the coordinate system of a display 426, which visually displays the images. The ultrasound imaging system 400 further includes a display 426 that visually displays the data, e.g., in a graphical user interface (GUI), which allows the user to rotate, scale, etc., the displayed data through a mouse, keyboard, touch-screen, etc.

The ultrasound imaging system 400 further includes a controller 428 that controls one or more of the components of the system 400, e.g., based on a mode of operation (e.g., B-mode, etc.). The ultrasound imaging system 400 further includes a user interface 430 that includes an input device (e.g., a physical control, a touch-sensitive surface, etc.) and/or an output device (e.g., a display screen, etc.). The user interface 430 can be used to select a mode, invoke scanning, and/or other function, e.g., via an input signal indicative of an input from a user.

In one instance, the transmit circuitry 416, the receive circuitry 418, the switch 420, the beamformer 422, the scan converter 424, the display 426, the controller 428, and the user interface 430 are part of a console, which is remote from the probe 402. In this instance, communication between the probe 402 and the console can be through a wired (e.g., a cable and electro-mechanical interfaces) and/or wireless communication channel. In this instance, the console can be a portable computer such as a laptop, a notebook, etc., with additional hardware and/or software for ultrasound imaging. The console can be docked to a docking station and used.

Alternatively, the console can be part (fixed or removable) of a mobile or portable cart system with wheels, casters, rollers, or the like, which can be moved around. In this instance, the display 426 may be separate from the console and connected thereto through a wired and/or wireless communication channel. Where the cart includes a docking interface, the console can be interfaced with the cart and used. An example of such a system is described in US publication 2011/0118562 A1, entitled "Portable ultrasound scanner," and filed on Nov. 17, 2009, which is incorporated herein in its entirety by reference.

Alternatively, the transmit circuitry 416, the receive circuitry 418, the switch 420, the beamformer 422, the scan converter 424, the display 426, the controller 428, and the user interface 430 are part of the probe 402 (e.g., enclosed therein and/or part of or integrated in a housing), which is configured as a hand-held ultrasound apparatus, with a housing that mechanically supports and/or shields the components within. An example such a device is described in U.S. Pat. No. 7,699,776, entitled "Intuitive Ultrasonic Imaging System and Related Method Thereof," and filed on Mar. 6, 2003, which is incorporated herein in its entirety by reference.

FIGS. 5 and 6 illustrate an example of a 2-2 composite focusing layer 412. FIG. 5 illustrate a perspective view of the focusing layer 412, and FIG. 6 illustrates a cross-sectional view of the focusing layer 412 along line A-A of FIG. 5. In this example, the focusing layer 412 includes two materials in a 2-2 composite in which each material is constant in an azimuth direction 502 and an axial direction 504, and not constant in an elevation direction 506.

The transducer array 408 includes a plurality of rows $508_1, \ldots, 508_i, \ldots, 508_k, \ldots, 508_N$ (rows $508_{i+1}$-$508_N$ are behind the acoustic window 414 and not visible in FIGS. 5 and 6) of transducer elements (collectively referred to herein as rows 508), where N is a positive integer greater than or equal to one. Each of the rows 508 extends in the elevation direction 506 and is transverse to the azimuth and the axial directions 502 and 504. A kerf 510 is between each row of the plurality of rows $508_1, \ldots, 508_N$.

The focusing layer 412 includes a plurality of rows $512_1, \ldots, 512_M$ (collectively referred to herein as rows 512), where M is a positive integer greater than or equal to one. Each of the rows 512 extends in the azimuth direction 502 and is transverse to the elevation and axial directions 504 and 506. In this example, a row is constructed either with a first material or a second, and not both materials. Furthermore, the rows 512 include rows of the first material interlaced with rows of the second material. For illustrative purposes, the first material is shown in FIG. 6 with a dot pattern ▓ and the second material is shown in FIG. 6 with a diagonal line pattern ▓.

In one instance, an end row $512_1$ includes the first material and not the second material, a next consecutive row $512_2$ includes the second material and not the first material, a next consecutive row $512_3$ includes the first material and not the second material, and this alternating pattern repeats thereafter, and an Mth-1 row $512_{M-1}$ includes the second material and not the first material, and an Mth row $512_M$ (which is at the opposite end from row $512_1$) includes the first material and not the second material.

Suitable materials include polymers such as silicone, thermoplastic (e.g., TPX), urethane, acrylic, epoxy, etc., and the first and second materials are different and have different longitudinal sound speeds, which enables a wide variety of sound speeds in the composite. Additionally, the constituent material acoustic impedances of the two materials are not vastly different. In one instance, the first material is a two-part castable urethane (higher sound speed) and the second material is a two-part castable silicone (lower sound speed). Another fast material is polypropylene, which has a higher speed than urethane, enabling wider composite speed variations, and its density is lower, reducing variation in acoustic impedance.

In this example, the end rows $512_1$ and $512_M$ have a greatest width (elevation direction) of the rows of the first material, and inner most rows $512_i$ and $512_k$ that include the first material and not the second material have a smallest width (elevation direction) of the rows of the first material. Rows of the first material between the outermost row $512_1$ and the inner most row $512_i$ have widths that decrease towards a center region 514, and rows of the first material between the outermost row $512_M$ and the inner most row $512_k$ have widths that decrease towards the center region 514. In one instance, the widths decrease monotonically. In another instance, the widths do not decrease monotonically.

In this example, an inner most row $512_j$ that includes the second material and not the first material has a greatest width (elevation direction) of the rows of the second material, and outer most rows $512_2$ and $512_{M-1}$ have smallest widths (elevation direction) of the rows of the second material. Rows between the outermost row $512_2$ and the inner most row $512_k$ have widths that increase towards the center region 514, and rows between the outermost row $512_{M-1}$ and the inner most row $512_j$ have widths that increase towards the center region 514. In one instance, the widths increase monotonically. In another instance, the widths do not increase monotonically.

The materials and their widths in the composite vary across elevation to vary the sound speed to achieve a predetermined focus. The following provides an example for a transducer centered at 7 MHz with an elevation width of 5 mm and a focal depth of 25 mm. If the faster material has a density of 1130 kg/m3 and longitudinal speed of 2110 m/s, and if the slower material has a density of 1120 kg/m3 and a longitudinal speed of 1000 m/s, the composite velocity could vary from 1350 m/s to 1860 m/s, requiring a thickness of 0.393 mm to achieve the desired focus for a minimum post width for each material of 0.020 mm and a maximum post width of 0.4 times the wavelength at the upper end of the frequency range. For this composite, the longitudinal impedance varies from 1.5 MRayl to 2.1 MRayl.

TPX has a longitudinal impedance of 1.8 MRayl. In one instance, the outermost acoustic matching layer has a longitudinal impedance around 2.4 MRayl. The GRIN composite should ideally have a longitudinal impedance between these values in order to maximize energy transmission among these layers. One suitable composite impedance is 2.1 MRayl, in which case the total energy lost due to impedance mismatch is less than 0.1 dB round trip. As long as the composite impedance is between 1.3 MRayl and 3.2 MRayl, the total energy lost due to impedance matching will be less than 1.0 dB round-trip. As long as the composite impedance is between 1.5 MRayl and 2.2 MRayl, the reflection between the composite and the lens will be less than −20 dB, which reduces interfering echoes within the probe.

In one instance, a fabrication technique such as micromolding is used to create the layers. A maximum feature size depends on the speed of sound in each material and a maximum frequency of interest because the composite features must be acoustically small. The minimum feature size depends on the limits of the processing techniques.

Figure 7:
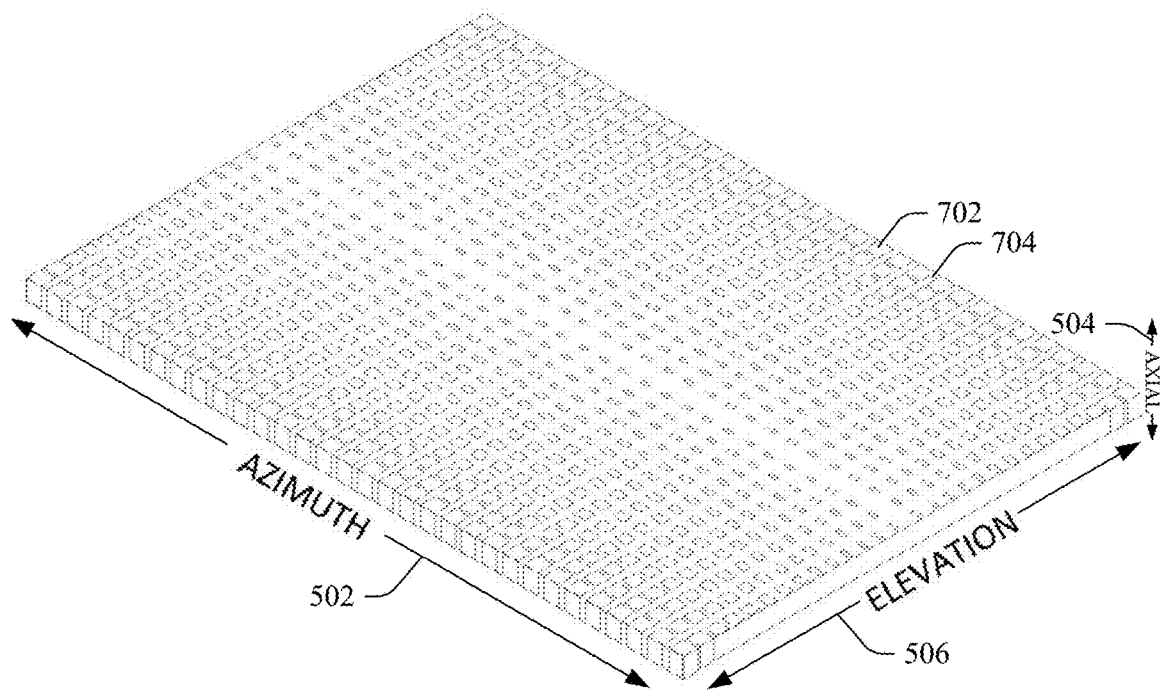
FIG. 7 illustrates a perspective view of an example of a 1-3 composite focusing layer of FIG. 4 with cuboid posts.
Figure 8:
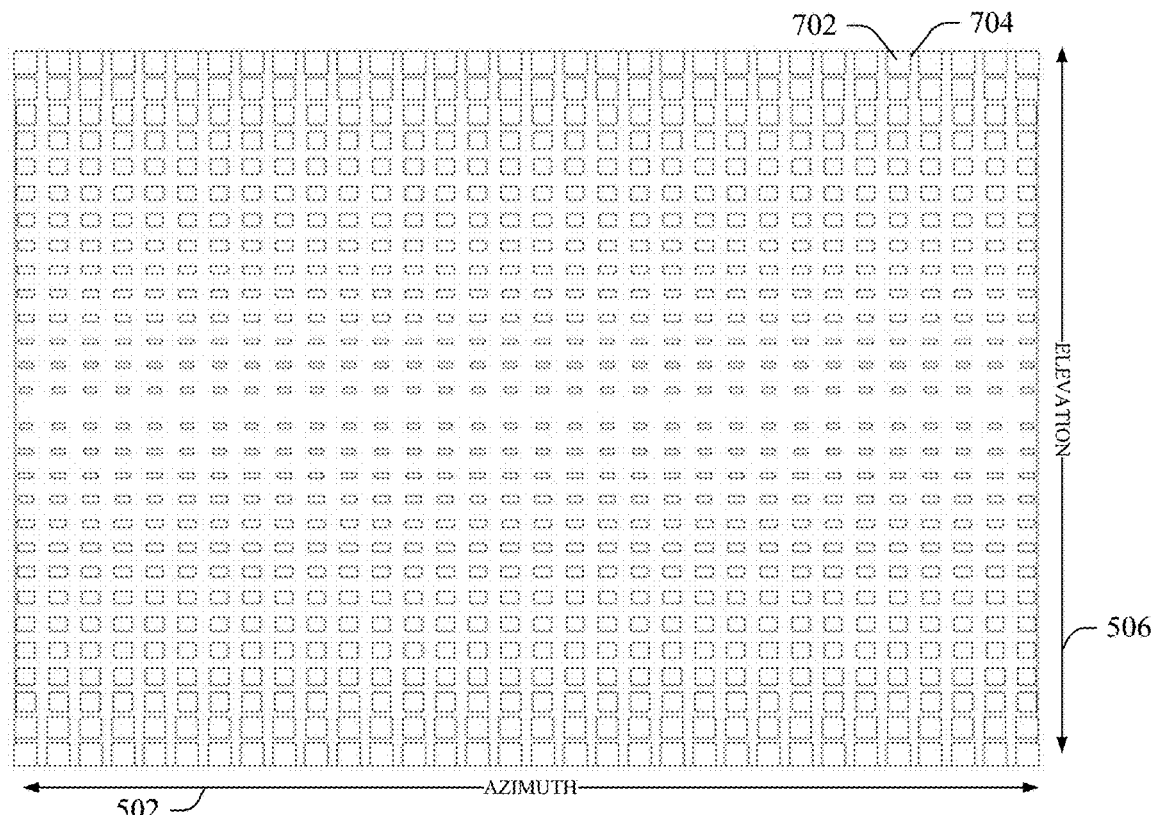
FIG. 8 illustrates a top-down view of the focusing layer of FIG. 7.

FIGS. 7 and 8 illustrate an example of a 1-3 composite focusing layer 412. FIG. 7 illustrates a perspective view of the focusing layer 412, and FIG. 8 illustrates a top-down view of the focusing layer 412. In this example, the focusing layer 412 includes two materials in a 1-3 composite in which faster material 702 is constant across the axial direction 504 and not in the azimuth direction 502 and the elevation direction 506, and slower material 704 is constant across the azimuth direction 502, the axial direction 504, and the elevation direction 506. In this composite, cuboid posts of the faster material 702 are embedded in a matrix of the slower material 704.

Figure 9:
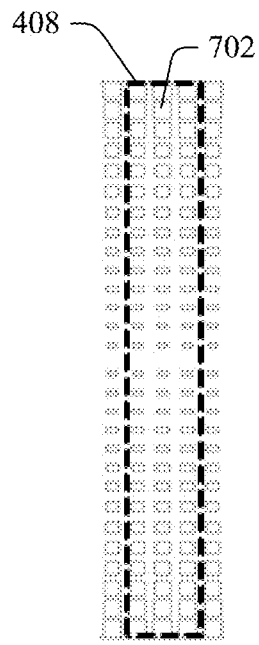
FIG. 9 illustrates an example where multiple rows of posts of the focusing layer of FIG. 7 align with a transducer element.
Figure 10:
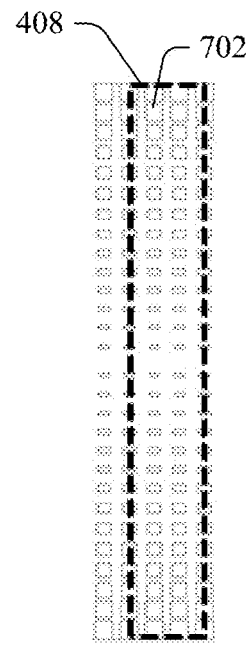
FIG. 10 illustrates an example where each of the multiple posts of the focusing layer of FIG. 7 are not aligned with a transducer element.
Figure 11:
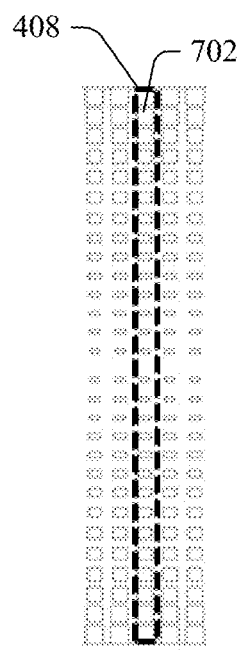
FIG. 11 illustrates an example where a single row of posts of the focusing layer of FIG. 7 aligns with a transducer element.

FIG. 9 shows an example where the 1-3 composite 412 of FIGS. 7 and 8 is made with fine enough features (e.g., smaller than ⅓ of the element pitch) that multiple rows of posts 702 (three in the illustrated example) overlay one transducer element 408. In this case, even with misalignment between the composite 412 and transducer element 408, as shown in FIG. 10, the element 408 interacts with multiple rows, and the composite still acts uniformly. FIG. 11 shows an example where the 1-3 composite 412 of FIGS. 7 and 8 is made with posts 702 with widths that are approximately the same as the width as a transducer element 408. In this instance, the composite 412 can be aligned to the elements within ¹⁄₁₀ of the element pitch with negligible effects.

Figure 12:
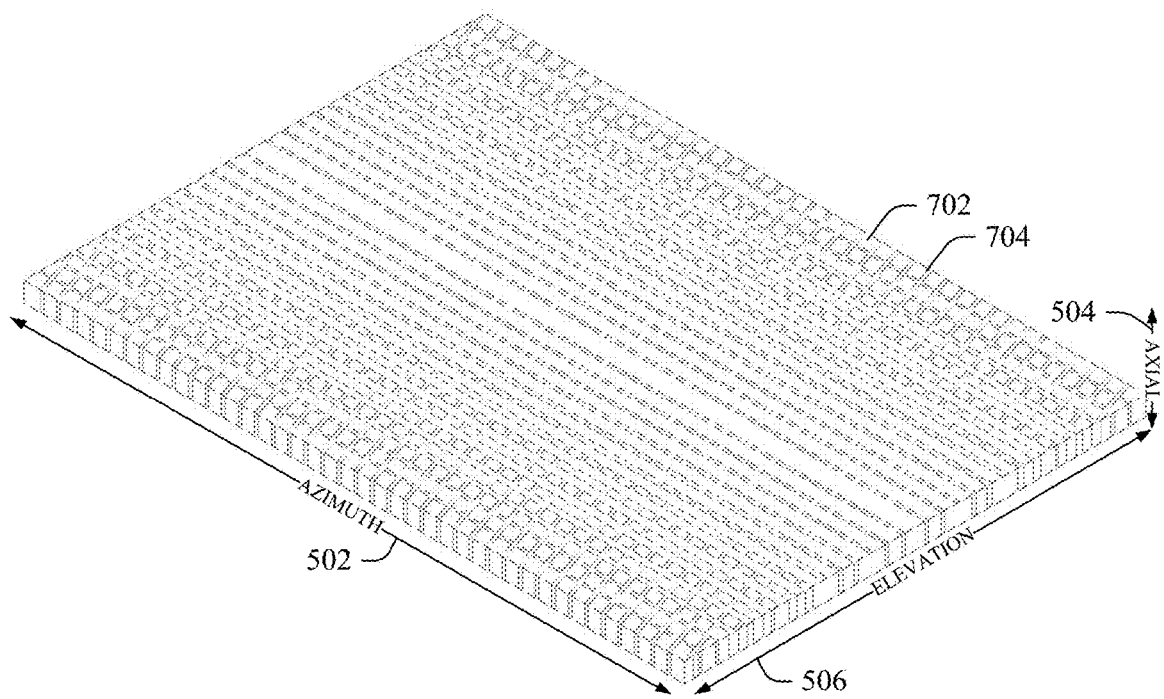
FIG. 12 illustrates a perspective view of another example of a 1-3 composite focusing layer of FIG. 4 with rhomboid posts.
Figure 13:
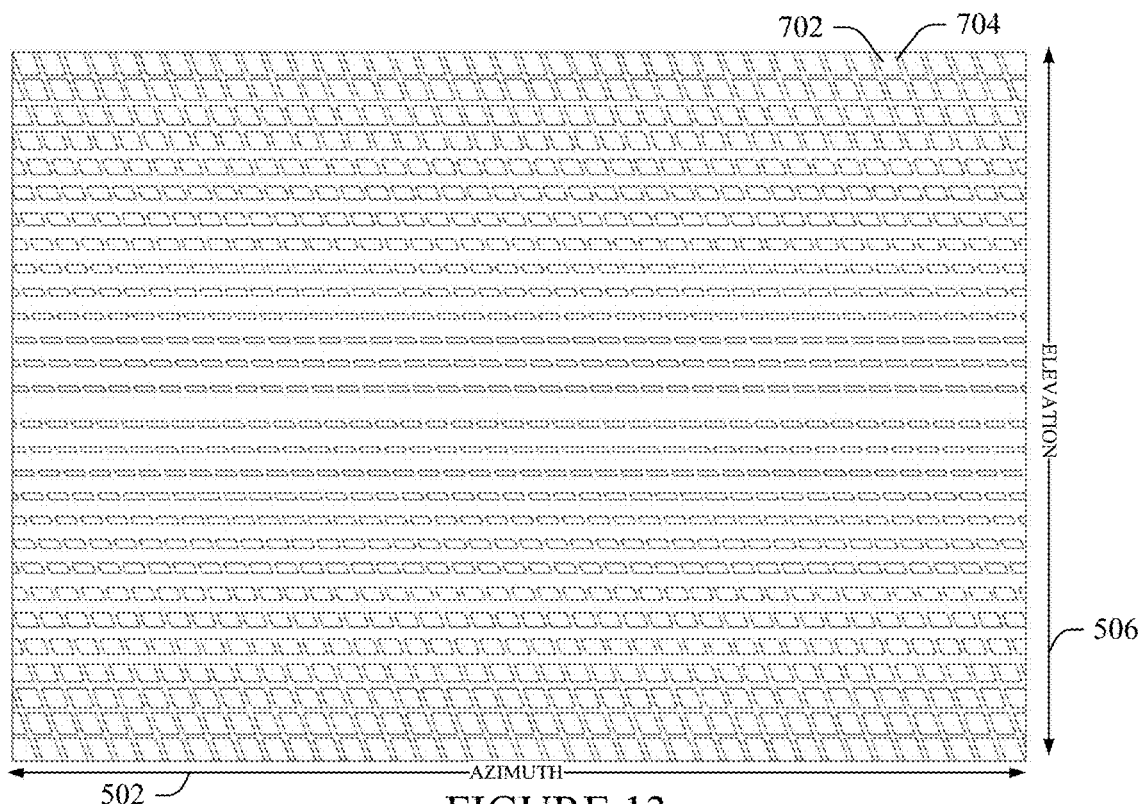
FIG. 13 illustrates a top-down view of the focusing layer of FIG. 12.

FIGS. 12 and 13 illustrate another example of the focusing layer 412. FIG. 12 illustrates a perspective view of the focusing layer 412, and FIG. 13 illustrates a top-down view of the focusing layer 412. In this example, the focusing layer 412 includes two materials in a 1-3 composite in which faster material 702 is constant across the axial direction 504 and not in the azimuth direction 502 and the elevation direction 506, and slower material 704 is constant across the azimuth direction 502, the axial direction 504, and the elevation direction 506. In this composite, rhomboid posts of the faster material 702 are embedded in a matrix of the slower material 704.

FIG. 14 shows an example where the 1-3 composite 412 of FIGS. 7 and 8 is made with posts 702 with widths that are approximately the same as the width as a transducer element 408 and the composite 412 is misaligned to the post 702 (e.g., by ⅓ of the pitch). In this instance, the volume fraction distribution will change since the material that had been only between elements is now on top of elements, so the focusing may not occur as intended. Furthermore, the composite posts will bridge the gaps between adjacent transducer elements, contributing to crosstalk between those elements. In general, crosstalk degrades the signal quality received by each element, and it reduces the angular response.

With the configuration of FIGS. 12 and 13, there is never perfect alignment between the posts 702 and the transducer element 408, and the degree of misalignment is consistent regardless of the absolute shift, as shown in FIGS. 15, 16 and 17. The composite volume fraction over that element 408 is unchanged. The volume fraction distribution and hence the focusing does not change like in FIG. 14 because the volume fraction is independent of alignment. With respect to bridging posts, since the posts are parallelograms, the overlapping areas are triangles of varying sizes along the elevation. There may be crosstalk, but it will be only slightly worse than the ideal alignment scenario for a rectangular composite, and it will be better than the worst-case misalignment scenario.

FIGS. 5-17 describe a focusing layer 412 for one-dimensional arrays where the acoustic energy is focused in the elevation direction. In another instance, the focusing layer 412 is configured as a two-dimensional lens, which could be used for focusing or defocusing (diverging) the acoustic beam from either a single-element transducer or a two-dimensional transducer array. This approach is well-suited for configurations of 2D arrays, such as row-column-addressed (RCA) arrays, which have orthogonal electrodes on the top and bottom of a grid of elements.

The flat RCA transducer design has a field of view that is inherently limited to a rectangular region in front of the array. The array could be curved to increase its field of view, but that is a challenging manufacturing process. A diverging single or compound lens may be applied to the array in order to widen its field of view, but these are limited by the relationship between the sphere shape (which introduces the focusing) and the array aperture. Specifically, the divergence is limited because the minimum lens diameter is the length of the array diagonal. FIG. 18 shows a limitation in traditional lenses for defocusing. When the lens diameter is less than active aperture, only a portion of the aperture is defocused.

The focusing layer 412 would not encounter the same limitations because the divergence is based on the variation in speed of sound rather than the variation in thickness. The speed of sound range is limited based on the constituent materials in the composite, but the appropriate delays (to achieve the desired focal characteristics) can be realized by adjusting the composite thickness. In this case, the distribution pattern of the two different materials would have circular symmetry. A diverging focusing layer 412 would have high volume fraction of fast material near the center and low volume fraction near the edge.

Figure 19:
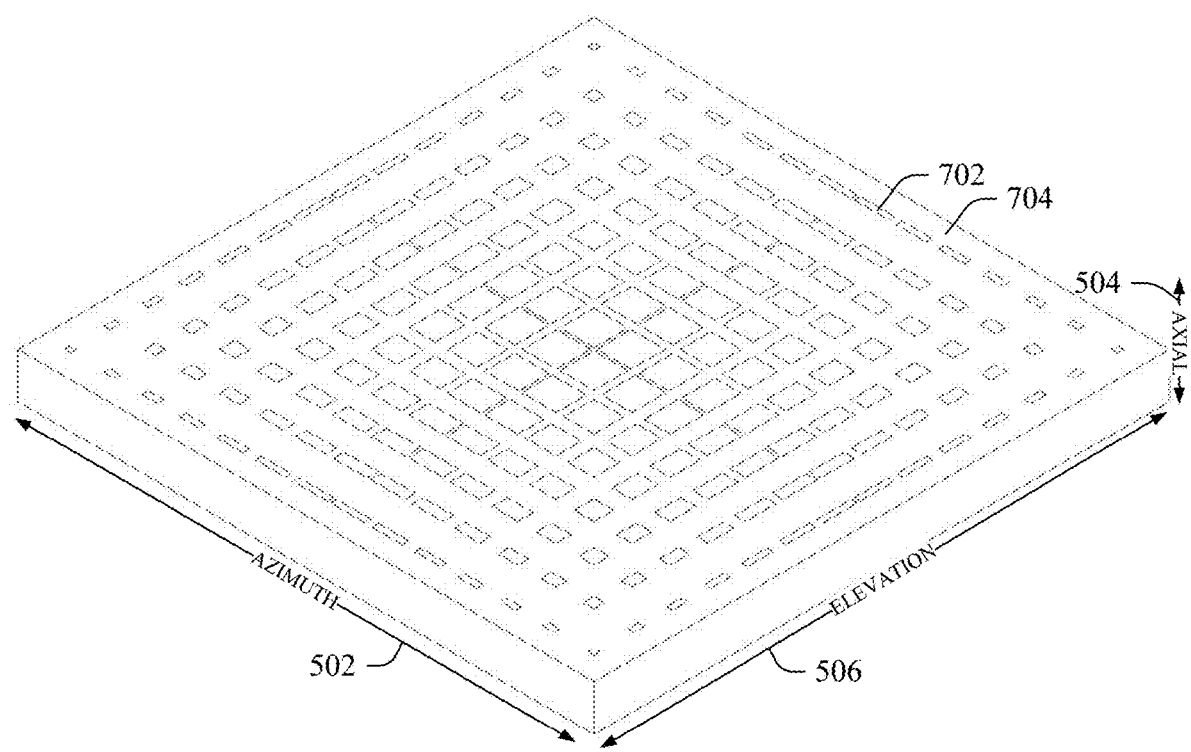
FIG. 19 illustrates a perspective view of yet another example of the focusing layer of FIG. 4.
Figure 20:
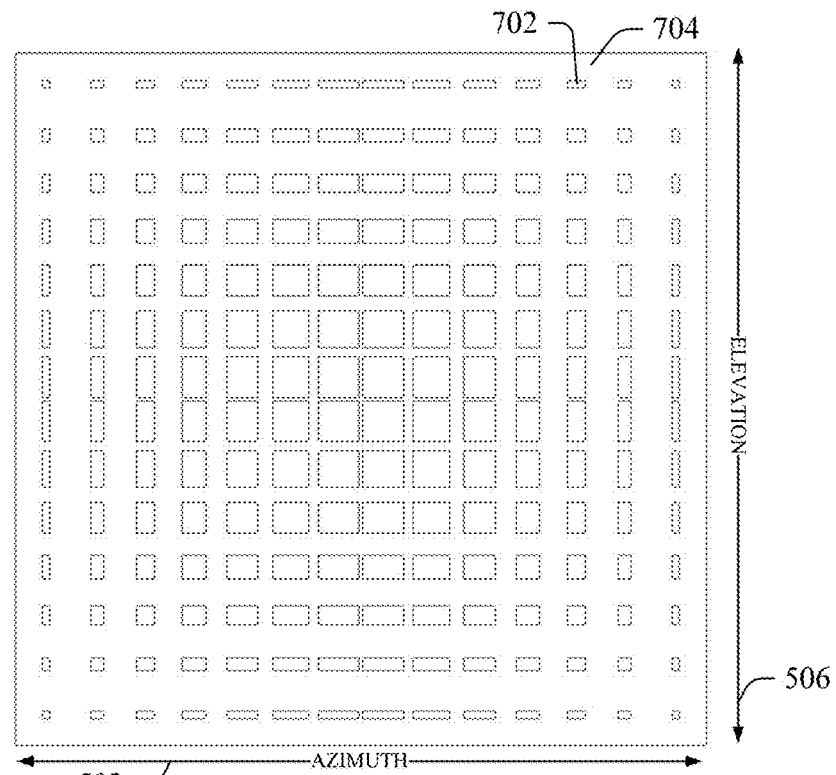
FIG. 20 illustrates a top-down view of the focusing layer of FIG. 19.

Conversely, a converging focusing layer 412 would have low volume fraction near the center and high volume fraction near the edge. An example is shown in FIGS. 19 and 20. FIG. 19 illustrates a perspective view of the focusing layer 412, and FIG. 20 illustrates a top-down view of the focusing layer 412. In this example, the posts 702 are rectangular shaped. In another instance, the posts 702 are circular shaped. In another instance, the posts 702 are triangular shaped. Example processing techniques are dice-and-fill, injection molding, imprint molding, additive manufacturing/3D printing, etc.

Figure 21:
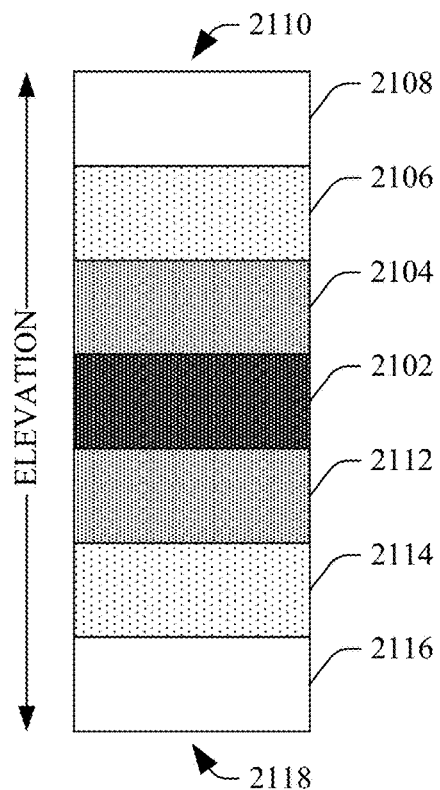
FIG. 21 illustrates an example of a 0-3 composite focusing layer of FIG. 4 with slower concentrated particulate distributed throughout a faster material.
Figure 22:
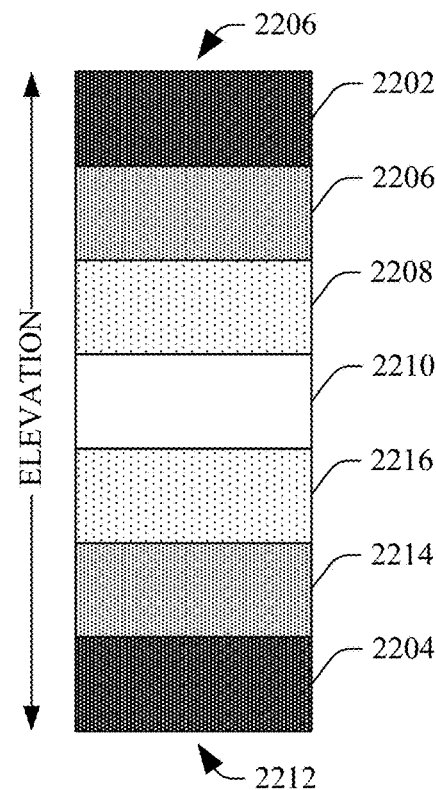
FIG. 22 illustrates an example of a 0-3 composite focusing layer of FIG. 4 with faster concentrated particulate distributed throughout a slower material.

FIGS. 21 and 22 illustrate other examples of the focusing layer 412. The focusing layer 412 in both figures includes two materials in a 0-3 composite in which one material includes concentrated particulate distributed throughout the other material and is not constant the azimuth direction 502, the axial direction 504 or the elevation direction 506, and the slower material 704 is constant across the azimuth direction 502, the axial direction 504, and the elevation direction 506.

The speed is highest where the concentration of the fast material is highest, and a spatial sound speed variation is produced due to a non-uniform distribution of the particulate. The concentration of the particulate could vary in discrete steps or continuously along the elevation direction. If the particles are magnetically sensitive, the layer could be cured in a magnetic field that would concentrate the particles in certain regions.

If the particulate is slower than the encapsulant (e.g., a dense particle like tungsten or bismuth oxide), then the highest concentration of particulate would produce the lowest speed and would be towards the center to make the fastest composite speed at the edges. FIG. 21 shows an example of this. As shown, the concentration of the slower particulate is highest in a central region 2102 along elevation and decreases through 2104, 2106 and 2108 to one end 2110, and through 2112, 2114 and 2116 towards the other end 2118, which is opposite the end 2010.

If the particulate is faster than the encapsulant (e.g., iron oxide or aluminum oxide), then the highest concentration of particulate would produce the highest speed and would be towards the edges to make the fastest composite speed at the edges. FIG. 22 shows an example of this. As shown, the concentration of the faster particulate is highest at end regions 2202 and 2204 along elevation and decreases from end 2206 through 2202, 2206 and 2208 to a center 2210, and decreases from an opposing end 2212 through 2204, 2214 and 2216 to the center 2210.

Figure 23:
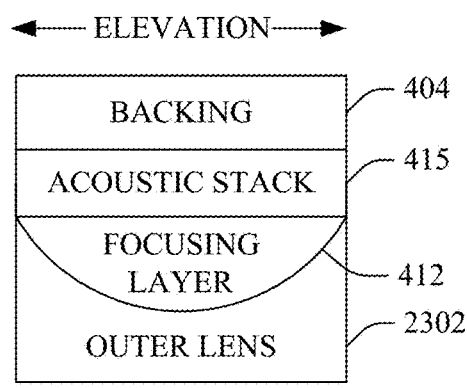
FIG. 23 illustrates another example with a planar-convex focusing layer and an outer concave-planar lens attached thereto.
Figure 24:
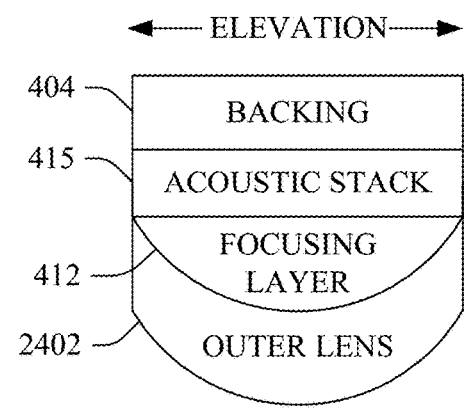
FIG. 24 illustrates another example with a planar-convex focusing layer and an outer concave-convex lens attached thereto.

FIG. 23 illustrates an example with a non-planar focusing layer 412. In this example, the probe 402 includes the backing 404, the acoustic stack 415, the focusing layer 412, which is a planar-convex lens, and a concave-planar outer lens 2302 attached thereto. FIG. 24 illustrates another example with a non-planar focusing layer 412. In this example, the probe 402 includes the backing 404, the acoustic stack 415, the focusing layer 412, which is a planar-convex lens, and a concave-convex outer lens 2302 attached thereto.

In the above embodiments, the example posts are cuboids or rhomboids. In a variation, the posts could be otherwise shaped, such as cylinders or polyhedron prisms. In addition, posts with non-parallel walls (e.g., a trapezoidal prism or truncated cone) are contemplated herein and would introduce velocity and impedance gradients in both elevation and thickness directions. Varying both the post cross-section through the thickness and relative spacing across elevation could produce an interesting combination of impedance matching and focusing effects.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A transducer probe, comprising:
    a transducer array with rows of transducer elements that each extend in an elevation direction and is transverse to an azimuth direction;
    a matching layer disposed adjacent to the transducer array; and
    a focusing layer disposed adjacent to the matching layer, wherein the focusing layer includes a first material with a first refractive index and a second material with a second refractive index, and the first refractive index is less than the second refractive index,
    wherein the first and second materials are distributed in an alternating pattern with the first material at edges of the rows, and
    wherein first widths of the first material decrease from the edges towards a center of the rows, and second widths of the second material increase from the edges towards the center.

2. The transducer probe of claim 1, wherein the first material is continuous in the azimuth direction and an axial direction and is not continuous in the elevation direction.

3. The transducer probe of claim 1, including alternating rows of the first and second materials that each extends in the azimuth direction and is transverse to the elevation direction.

4. The transducer probe of claim 1, wherein the first material is continuous only in an axial direction and not in the azimuth or elevation directions, and the second material is continuous in the axial, azimuth and elevation directions.

5. The transducer probe of claim 4, wherein the first material are posts within a layer of the second material.

6. The transducer probe of claim 4, wherein the second material are posts within a layer of the first material.

7. The transducer probe of claim 5, wherein the posts have a shape from a group consisting of a cuboid, a rhomboid, cylinder, and a polyhedron prism.

8. The transducer probe of claim 1, wherein the focusing layer includes a zero-three composite in which the first material includes a concentrated particulate distributed throughout the second material, with a higher concentration of the particulate at a central region, a lower concentration of the particulate at end regions, and a varying concentration of the particulate therebetween which decreases from the central region to the end regions.

9. The transducer probe of claim 1, wherein the focusing layer is planer-planer.

10. The transducer probe of claim 1, wherein the focusing layer is planer-convex, and further comprising: a concave-planar outer lens, wherein the concave side of the outer lens is coupled to the convex side of the focusing layer.

11. The transducer probe of claim 1, wherein the focusing layer is planer-convex, and further comprising: a concave-convex outer lens, wherein the concave side of the outer lens is coupled to the convex side of the focusing layer.

12. The transducer probe of claim 1, wherein the transducer elements include capacitive micromachined ultrasonic transducer elements.

13. The transducer probe of claim 1, wherein the transducer elements include solid piezoelectric, single crystal transducer elements.

14. The transducer probe of claim 1, wherein the transducer elements include piezo-composite transducer elements.

15. The transducer probe of claim 1, wherein at least one of the first or the second material includes polymethylpentene.

16. The transducer probe of claim 1, wherein the focusing layer includes at least five rows, including a first row with the second material, followed by a second row with the first material, followed by a third row with the second material, followed by a fourth row with the first material, and followed by a fifth row with the second material.

17. The transducer probe of claim 1, wherein the first row includes only the first material and the second row includes only the first material.

18. The transducer probe of claim 1, wherein the focusing layer has a composite is between 1.3 and 3.2 mega-Rayleigh.

19. The transducer probe of claim 1, wherein the first material is a two-part castable urethane and the second material is a two-part castable silicone.

20. The transducer probe of claim 1, wherein the first widths of the first material decrease monotonically and the second widths of the second material increase monotonically.

* * * * *